Oct. 27, 1925.
I. L. DUNN
1,558,796
APPARATUS FOR AND METHOD OF RENEWING OIL WELLS
Filed Jan. 5, 1925    2 Sheets-Sheet 2
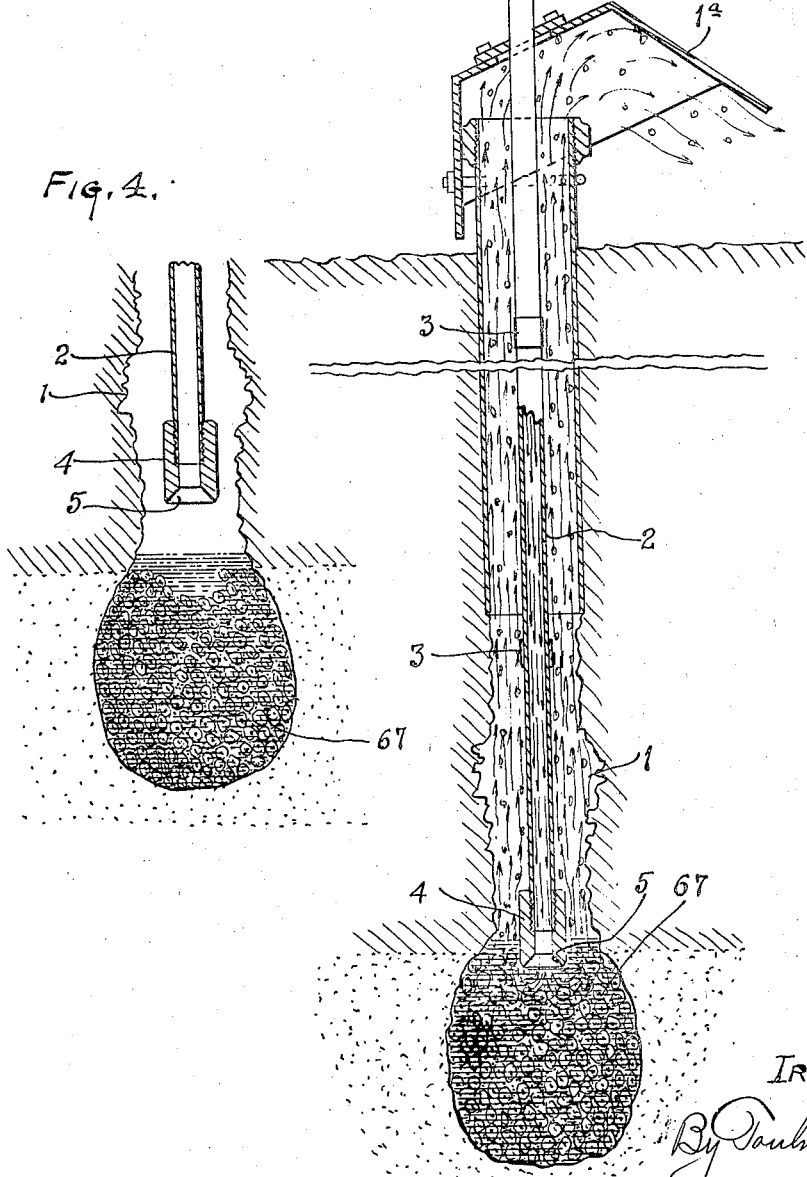
INVENTOR
IRWIN L. DUNN,
ATTORNEYS Patented Oct. 27, 1925.

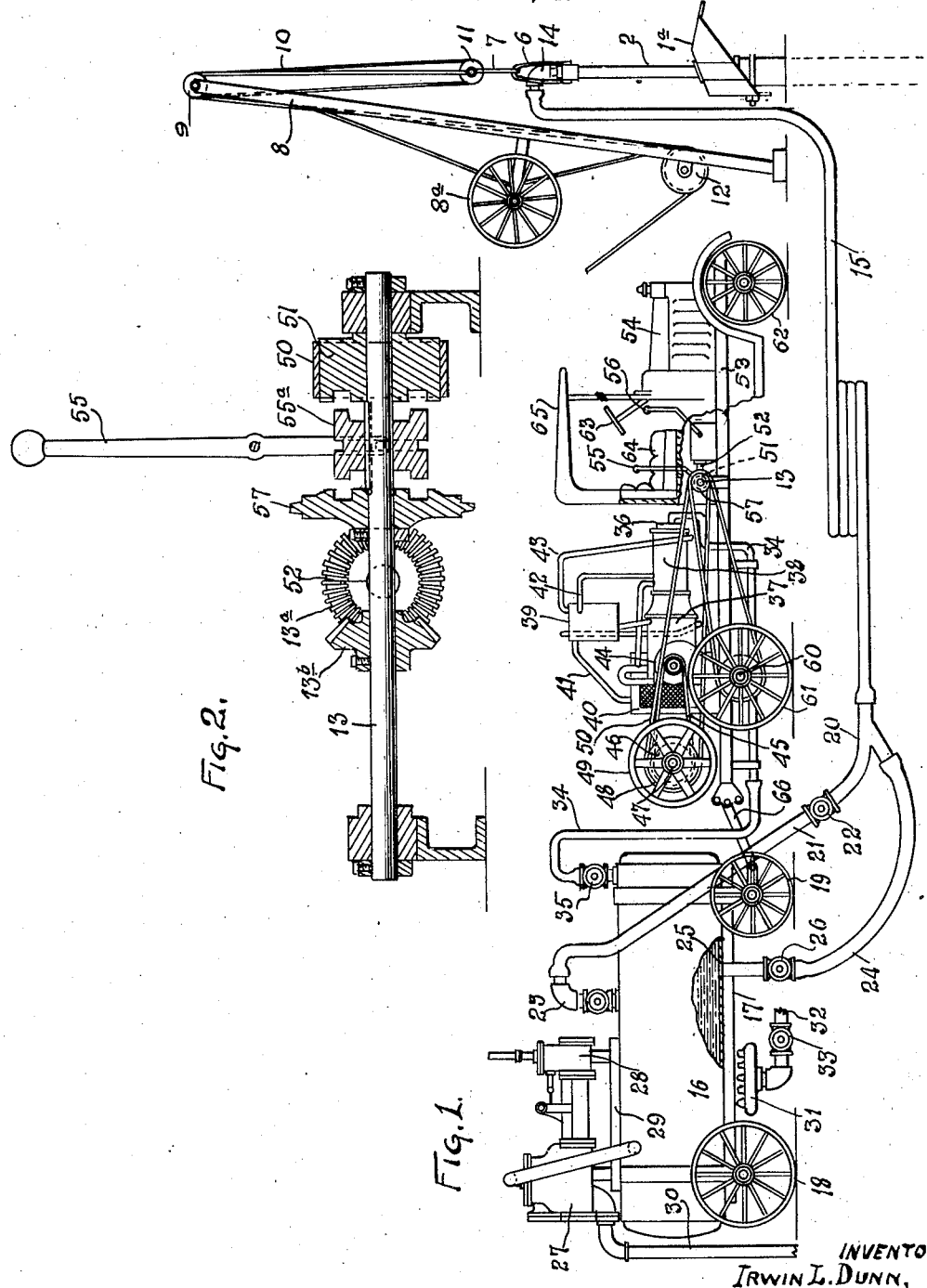

1,558,796

UNITED STATES PATENT OFFICE.

IRWIN L. DUNN, OF MARIETTA, OHIO, ASSIGNOR TO TIDAL-DUNN COMPANY, OF TULSA, OKLAHOMA, A CORPORATION OF OKLAHOMA.

APPARATUS FOR AND METHOD OF RENEWING OIL WELLS.

Application filed January 5, 1925. Serial No. 564.

*To all whom it may concern:*

Be it known that I, IRWIN L. DUNN, a citizen of the United States, residing at Marietta, in the county of Washington and State of Ohio, have invented certain new and useful Improvements in Apparatus for and Methods of Renewing Oil Wells, of which the following is a specification, reference being had therein to the accompanying drawing.

This invention relates to an improved plant or system of apparatus for, and improved method of, renewing oil wells by the removal of natural detritus or débris with which such wells become clogged after periods of use, in consequence of which they either entirely cease to flow or produce oil, or can be pumped only at prohibitive expense, at great loss to their owners and to the disadvantage of the public in the material reduction of oil supply which arises from this condition due itself to uncontrollable natural causes.

This invention and discovery consists, in substance, as to its mechanical branch, of a portable plant composed of several apparatus which in their aggregate constitute a system or layout; such plant or system comprising a portable motor for the development of power, a portable air compressor operable by such motor, a portable pressure tank preferably adapted to contain water in large quantity and air under pressure, a traction or hauling means, mechanical or animal, a portable winch, a portable pulling machine or derrick, a portable combined hammer and fluid introducing element. These several portable apparatus may be given the capacity of mobility or portability through the medium of one wheeled chassis on which the several apparatus are mounted, or may be mounted on separable chassis in the sense that one or more of these major units will be carried on an individual chassis.

It consists, as to the method branch, of the presence of a quantity of water or oil more or less submerging the detritus or débris down in the well; the application of heavy blows by a hammering instrumentality against such detritus or débris; the introduction against and among the detritus or débris of a pressure medium, preferably atmospheric air, under high pressure, to carry the broken fragments with quantities of the water, upward, through and out of the well; in supplying further charges of water if the quantity of débris or detritus requires; and in introducing into the well, under pressure, washing-out water, oil or other fluid to finally cleanse the interior of the well.

The portable system or plant above set forth and the method above recited have been put to actual, practical use in renewing oil wells with satisfactory, practical results performed efficiently and economically. Under the old system in which it was and is the custom to clean out wells when they are in the condition referred to by means of the usual cable tools or drill outfit, whereby the material was slowly loosened and then had to be bailed out with the ordinary type of oil well bailer or sand pump, the work was slowly and inefficiently done. It has generally taken from ten to twelve days, for instance, to clean out a well of say one thousand feet or so of depth at an expense ranging from five hundred dollars to twelve hundred dollars. The time thus consumed and the resultant expense have operated to deter well owners in thousands and thousands of instances, and are so operating, from undertaking the work of cleaning out their wells in view of the risk that the re-flow or yield of oil or reduction in pumping expense would not possibly be adequate to compensate them for this risked expense. But in those cases where the operators were willing to assume the chance, still the time and cost have been and are great.

By reason of the practical application and use of my improved system or plant and my method above set forth, I have ascertained the fact to be that such wells as required ten to twelve days by the old method require from a few hours to two days, at an expense to the well owner of from thirty dollars to two hundred dollars by my method.

Among the factors which contribute to this quick cleaning or renewing of the wells and this low cost are these: that one plant or system, because of its portability, is capable of moving quickly from well to well or from groups of wells in one territory to groups of wells in other territories, some miles away, and so the investment in one plant becomes quickly available for use in an endless number of wells without undue consumption of time in transit from one well to another; that the plant or system so comprised and the method employed act with great rapidity in the breaking down of the detritus or débris and the removal of the resulting fragments as also act with thoroughness in cleansing the wells, whereby the renewed flow is readily permitted promptly upon the quick removal of the hitherto obstructing detritus or débris and pumping difficulties and expenses are reduced.

This movable plant or system and the method described I have found in practice to overcome the difficulties, disadvantages and excessive expenses incident to the old methods now in vogue.

In these old methods the cleaning out of oil wells with drilling tools and bailer has many disadvantages, among them being that the process is slow and expensive; not all the loose material can be removed from the well; production is lost during the time the well is being cleaned out; if the well has been vacuum pumped the inrush of air often draws the mud, sand, paraffin and water into the pores of the sand and clogs them to such an extent that at times the production is lessened rather than increased; or the inrush of air may overcome the effects of vacuum for many days and cause not only the loss of production for the period during the time the well is being cleaned out, but for many days thereafter.

In the accompanying drawings, I have illustrated the preferred plan of constituting the portable system or plant. In these drawings:

Figure 1 is a side elevation of one embodiment of my plant or system of apparatus showing it mounted on two transporting units.

Figure 2 is a detail view illustrating one mode of operating the air compressor, the winch and the traction wheels and one transporting unit, all by means of the truck motor.

Figure 3 is an enlarged vertical sectional view of an oil well with my combined hammer and pressure fluid conduit, as also the casing and hood shown in section; the lines or arrows pointing downward within the conduit showing the direction of blows and passage of the pressure fluid into the well, and the lines or arrows pointing upward showing the fragments of detritus or débris with the pressure medium and more or less water discharging upward out of the well.

Figure 4 is a similar sectional view through a well showing the hammering instrumentality at the upper end of a stroke and about to be brought down to effect a blow upon the detritus or débris.

I shall first describe that branch of my invention which relates to the plant or system of machines, and after that will set forth the method branch because in that way I deem the method will be the more readily understood.

Let it be assumed that an oil well indicated by the numeral 1 has been in use and has reached a stage of disuse because of the collection within it of detritus or débris which through natural processes will inevitably gather in these wells and prevent or hinder the further flow of oil or cause prohibitive pumping expense by reason of sand or other particles getting into the pumping mechanism and cutting out the cups or other parts. The problem is to effectively, cheaply and rapidly remove all of this accumulation. For this purpose my improved plant is brought up to such a well. The elements of the plant or system of apparatus include the combined hammer and pressure fluid conduit, indicated at 2, which is in the nature of a line of pipes of sufficient length to extend down into the well, and capable of being lengthened by additional sections through the use of appropriate couplings, as indicated at 3. The lower end of this conduit is equipped with a hammer, designated 4, formed of a heavy shell of steel with its lower end more or less sharpened by means of a bevel 5, and screwed or otherwise secured to the lower section of the conduit. At the upper end the conduit is equipped with a swiveled bail 6 adapted to raise the hammer conduit by means of the cable 7 and to permit it to violently drop to strike the necessary blows when the cable is slackened. To these ends a derrick 8 is set up, near and over the well. It has transporting wheels 8ª and may be coupled with one of the other portable units when the plant is to be moved from one locality to another. Suitable sheaves 9 are mounted on the derrick to support the cable 10 which runs about a sheave 11 connected with the bail 6. A winch 12 is also mounted on the derrick and operated in any convenient manner, so that the winch is operated to cause the cable to lift the hammer conduit and permit it to quickly and violently drop to effect the requisite blows on the detritus or débris to break it up into fragments.

The hammer conduit is further equipped with a swiveled elbow coupling 14 to which is attached a hose line 15 which is supplied with the pressure medium for use in connection with the hammer in dislodging and disturbing the detritus or débris, and for discharging the broken particles upward through the well, accompanied by more or less water and any oil that might happen to be present during the period of renewing the well.

The pressure medium is preferably air though in some cases there might be available quantities of natural gas that could be utilized as such medium.

The hose line 15 connects with a source of supply of the pressure medium, in referring to which I shall use the term air as all comprehensive in order to shorten the reference. This source of supply is a portable storage tank indicated at 16 and made portable by means of being mounted on a wheeled chassis, the frame of which is designated 17 and the wheels 18 and 19. This tank will be capable of withstanding a test pressure of five hundred or more pounds per square inch. It is connected with the hose line by means of an elbow pipe 20, one branch of which is attached to an air pipe 21 having a cut-off 22 and opening into the interior of the tank through a coupling 23; while the other branch connects with a water line formed of a hose or pipe 24 which enters the storage tank at 25 and is equipped with a cut-off 26. The tank contains a quantity of water used to resupply the quantity needed in the well for use in connection with the disintegration of the detritus or débris and for the elevation and discharge of the same from the well by means of the pressure medium as will presently more fully appear; and sufficient for use also in carrying out the washing step of my method in which the well is to be thoroughly washed out as the last step in effecting its renewal.

To this end the storage tank is equipped with a pump, preferably a power pump comprising a pump proper designated 27 and an engine indicated at 28, preferably operable by compressed air supplied by the tank 16 and suitably connected to the pump to effect its operation. A common base 29 carries the power pump elements and is mounted on the tank or tank chassis. A water supply pipe 30 is led off from the pump to such supply as may be available—a stream or well, for instance.

A gas burner or other heating device 31 is properly positioned to effect the heating of the storage tank. As shown, a natural gas line pipe 32 is indicated and is connected with the burner by a controlled mixer 33. In this way the water is heated, when required, for use in the washing-out step whereby it may be made effective for dissolving any paraffin or other congealed substance that might later interfere with the free flow of the oil.

The air is supplied to the tank and put under the desired pressure by means of a portable air compressor connected with the tank through an air line comprising a pipe 34 in communication with the interior of the tank and having a cut-off 35 to close the communication when the requisite or maximum pressure desired shall have been reached. This line extends to the compressor as indicated at 36.

This compressor is preferably of the two-stage type, having a low pressure cylinder 37 and a high pressure cylinder 38 to which latter the air line 34 is connected at 36. I shall not go into the details of the construction of the compressor as any suitable machine of this character may be used. I will add, however, that this power plant includes a cooling water tank 39 and a radiator 40 to supply and circulate cooling water. Circulating pipes 41, 42 and 43 connect the tank and radiator and the water jackets of the compressor with the water tank. A rotary pump 44 performs the office of circulating the cooling water through these instrumentalities. This pump is driven by a belt 45 operated by a pulley 46 on the compressor driven shaft 47 which also carries a pulley 48 and a balance wheel 49. The pulley 48 carries the driving belt 50 which itself is driven by a pulley 51 on the power shaft 13.

This power shaft is suitably coupled with the transmission shaft 52 of the motor of any conventional type mounted on the chassis 53 within the hood 54. A lever 55 is used to operate a clutch 55$^a$ to connect the power shaft 13 with either the sprocket wheel 57 to drive the rear chassis wheels or the pulley 51 which operates the belt 50 to actuate the compressor. To effect a connection between the transmission shaft 52 and the power shaft 13, bevel gears 13$^a$ and 13$^b$ are used. A lever 56 is used in the common way of shifting the transmission shaft into gear connection with the engine shaft through the medium of the clutch. Traction wheels 61 are carried by the axle 60 and operated by this chain and sprocket gearing and serve to support the rear end of the chassis while forward ground wheels 62 support the other end and are steered in the conventional way by a steering column and wheel 63. A seat 64 and top 65 complete the truck structure.

The derrick or the pulling out mechanism is rendered portable by being temporarily mounted near the wells and attachable to, say the portable tank unit.

The hammer device is made portable on withdrawal from the well as by being placed on one of the chassis.

It is further to be understood that the air under pressure in the portable tank 16 acts to press the water out of the tank and through the intermediate connections down into the well to further supply it with water during the disintegration operation, as also to finally wash out the well after the detritus and débris have been removed; or the further supplies of water before or during the disintegrating operations may be otherwise supplied.

It is further to be observed that the hammer conduit is the preferred means of so introducing into the well these further supplies of water and the final washing-out water.

The hood indicated at 1$^a$ in Figure 1, and which is made the subject of one or more claims in my co-pending application, Serial No. 744,675, filed October 20, 1924, is used to deflect the upward flying detritus or débris downward into piles to prevent possible injury to attendants or crops growing near the well.

It is still further to be understood that the pressure fluid as air, or in some cases gas, which passes down through the hammer conduit into and amongst the detritus or débris, indicated generally by the numeral 67, aids in the loosening up of the material and thence reacting against the obstructing material lifts the fragments and rushes upward with more or less of the saturating water out of the well casing and finally deposits fragments or loosened material on the ground.

It will now be seen that this compressor unit is portable on and operable by the truck and its motor. To enable this portable unit to carry the portable storage tank unit with it from place to place and to properly position it at times when wells are being treated, a suitable coupling indicated at 66 is employed. A compressor capable of putting the air under a pressure of four hundred pounds to the square inch, I have found effective in operating on wells of fifteen hundred feet depth. But of course, the size and capacity of the compressor will vary in the different plants or systems according to what may be necessary in the particular cases of use.

It will now be seen that my traveling system of machinery comprises a portable hammer-conduit actuator in the nature of a pulling machine unit; a portable power plant preferably having the capacity of self-propulsion by traction means, such plant functioning to furnish the power for the other units; a portable compressor unit operable by the power plant and preferably mounted on the plant chassis; a portable pressure tank transportable with the power plant and having detachable connections with the portable hammer conduit unit and with the portable compressor unit, whereby such tank is supplied with air or other pressure medium under high pressure which may be furnished through said connections to the hammer conduit; and that such portable tank is equipped with pumping mechanism to supply it with water which is put under pressure by the contained air or pressure medium which causes the water to pass through a suitable connection to the hammer conduit for the purposes before stated.

These several units—portable hammer conduit, portable actuator therefor, portable power plant, portable compressor unit, portable air and water storage unit, and the various connections for the transmission of power and for conducting the pressure medium or compressed air and the water under pressure from one unit to the other—are characterized by their ready portability and readiness of use on and adaptability to oil wells variously scattered and in varying conditions of depth and causes of non-use; and that by reason of their combined mobility and ready adaptation to meet the varying scattered conditions pertaining from well to well, I have produced an effective system of apparatus for the thorough and quick renewal of oil wells by the disintegration of their contained accumulated detritus or débris and the excavation of the fragments of the same from the wells and the final cleansing of the well bores and pockets—all to the end of economically and quickly reconditioning the wells to enable the reflow of the oil into them and its subsequent withdrawal from the wells to the profit of the operators and the benefit of the public in the increased production.

Referring now to my improved method I would state that it consists in the following steps: first, the presence of a quantity of water, oil or other fluid more or less submerging the detritus or débris down in the well, found therein or supplied thereto; the application of heavy blows effected by an instrumentality in the nature of a hammer conduit against such detritus or débris; the introduction against and among the detritus or débris of a pressure medium, preferably atmospheric air, under high pressure, to carry the broken fragments with quantities of the water upward, through and out of the well; in supplying further charges of water when and as required by the amount and condition of the detritus or débris; and in introducing into the well, under pressure, washing-out water to finally cleanse the interior of the well; the introduction of the pressure medium being performed by preference concurrently with the administering of the hammering blows against the detritus or débris, so as to add the disturbing force of this blast to those of the hammering action as well as to gather up and carry off up through the well the loosened fragments as they result from the blows. Again, the blows are intermittent while the blast is continuous so that no time is lost in the attack on and loosening disturbance of the detritus or débris.

In the practical use of this method among existing wells clogged or partially clogged with detritus or débris in oil fields I have found it to be effective and efficient; and I am enabled to put this method into quick operation from well to well by reason of the ready mobility of an operating plant or system of machinery such, for instance, as set forth herein as constituting an embodiment of the mechanical branch of this invention.

As further explanatory of my method and the incidents that arise in connection with its practical application, I would say that in cleaning out a well I lower the tubing or pipe until it touches or nearly touches the top of the detritus that has accumulated in the well. If water or oil is not present in the hole I introduce several barrels of water or other liquid. If, on the other hand, the hole is filled up with a considerable depth of oil or water the excess liquids must be bailed, pumped or preferably blown from the well before the detritus can be blown out effectively. When it has been ascertained that the proper conditions exist in the well, the air or gas under high pressure is turned suddenly into the pipe or tubing and emerging at the bottom against the detritus, it blows it and the water or oil up and out of the annular space between the tubing and the walls of the hole or the casing that lines the walls of the hole. As the detritus is blown out, I lower the pipe or tubing until it is necessary to put on additional lengths of tubing or pipe, whereupon I shut off the supply of compressed air or gas and screw on additional lengths of pipe or tubing and introduce more water or other cleansing liquids if such is found necessary, and these operations are continued until the bottom of the hole has been reached and the well has been thoroughly cleaned of detritus.

At times the tubing or pipe may be lowered too far into the detritus so that the air pipe or tubing is clogged. I then raise the pipe or tubing until the plug can be blown out. At other times large pieces of rock are found in the hole and I then raise the pipe or tubing and drop it upon the rock and break it into smaller fragments which can be blown out of the hole. At other times the oil sand takes the compressed air or gas so freely that the pressure is lowered until the detritus cannot be blown from the well effectively. I then pour more water or other fluid into the hole which penetrates and partially clogs the pores of the sand so that by quickly applying the pressure the detritus can be blown from the hole.

After the detritus has been blown out of the hole and the bottom is reached, I then wash the well pit thoroughly with water or other cleansing fluid. When the sand is clogged with paraffin I may introduce hot water, preferably salt water, and force it into the well to help melt the paraffin, or I may use hot crude oil or oil products, or I may introduce steam into the well and blow out the melted paraffin and obstructive materials.

After the well is cleaned out satisfactorily the pumping mechanism is put in again and the well is ready to produce. If the ordinary deep well plunger pump is being used, I use the tubing with a working barrel at the proper place near the bottom to clean out the wells with and then introduce the valves, plunger, sucker rods and other parts of the pumping mechanism into the tubing after the operation of cleaning the well has been completed.

I find from my experience in cleaning many wells by this method that I can clean out wells much more quickly than by the usual practices, much more effectively and at less cost. I also find that the air or gas under high pressure suddenly applied against the face of the oil sand enters the pores of the sand and builds up a local pressure around the hole so that when the pressure is relieved in the well a few minutes later, this compressed air or gas in the pores of the sand reacts to force its way violently back into the hole, cleaning the pores of mud, paraffin and other obstructive material.

I would observe that while I have referred to the hammer conduit instrumentality as itself portable, still there may be cases where this instrumentality or parts of it, unless it be the hammer itself, are found on the premises or may be made up there. It is in this sense that the term portability in respect to this feature is to be understood.

In cases where the wells are more particularly clogged with caved-in sand or other comparatively soft material, as distinguished from rock, I find it feasible to strike lighter blows, or even to let the hammer conduit settle down into this softer material as it is blown out by the pressure medium. This mode of operation is intended to be comprehended in the references to the function and purpose of the hammer conduit, for whether the descent of this instrumentality into the clogging detritus or débris is accomplished by a succession of blows as in most instances, or by a sinking effect through such obstructions as would permit of this, is not material.

It is further to be observed that the pressure medium acts also as a disintegrating agent in those cases where the clogging material is soft enough to yield to it.

I also find that the violent blast of air and water against the face of the oil sand rock in the well will often dislodge fractured parts of the sand rock and give a fresh face freed from paraffin, gypsum or other mineral matter that may have been deposited in the pores or on the face of the sand rock and which obstructed the flow of oil into the hole.

I would further observe that the intervention of the pressure medium tank between the compressor and the conduit by which the pressure is introduced into the well is an important factor in the practical transportation and operation of my plant or system. The reason of this is that such intervention of the pressure tank affords means for storing the air, gas or other medium under pressure, 350 to 600 lbs. to the square inch or generally 450 lbs. to the square inch, and in volume sufficient to operate rapidly and successfully on the detritus or débris in the well yet with the use of a compressor unit of restricted weight, say something like five tons, to come within the limits of what is portable under practical oil field conditions. By this intervention of the tank to so obtain the pressure and volume required I can and do use an entire portable compressor, of something like five tons weight as just stated. But for such tank the compressor would have to be of such weight and capacity as to preclude the feasibility of portability besides adding such an item of cost as would be objectionable to the buyer.

Again, the feature of the portable connection, in the nature of the hose line 15 before referred to, between the air tank and the conduit by which the pressure medium is introduced into the well, is a highly useful feature in this association of mechanism because of its ready application and its capacity to accommodate extreme up and down movements, and to permit the lowering of the pressure conduit deep down in the well.

And again, when the well has been freed of the detritus or débris and is to be washed out, the pressure medium, as the air, in the tank, not only discharges water therefrom, under pressure sufficient to give the water the requisite force to violently attack the interior of the well for cleansing purposes, but also aerates the water to such a degree that two results follow, namely, first, a violent churning of the water within the well to make it more effective in cleansing; and secondly, an easier discharge of the cleansing water up, through, and out of the well by the pressure of the air because this aeration of the water tends to make it a lighter body to elevate. This special feature of my plant and method forms the subject of a separate application based upon this subject-matter segregated from its association with the other mechanism and method steps set forth herein.

It will be understood that I desire to comprehend within my invention such modifications as may be necessary to adapt it to varying conditions and uses.

Having thus fully described my invention what I claim as new and desire to secure by Letters Patent of the United States, is:—

1. A portable well renewing system comprising the following elements: portable hammer and pressure medium conduit instrumentalities insertable in and removable from a well and adapted to deliver blows and pressure fluid to disintegrate and discharge from the well detritus and débris; portable actuating mechanism for such instrumentalities; a portable power unit; a portable compressor unit; a portable pressure medium tank unit; connection between such tank unit and said compressor unit; and power-transmitting mechanism between the power unit and the compressor unit.

2. A portable well renewing system comprising the following elements: portable hammer and pressure medium conduit instrumentalities insertable in and removable from a well and adapted to deliver blows and pressure fluid to disintegrate and discharge from the well detritus and débris; portable actuating mechanism for such instrumentalities; a portable power unit; a portable compressor unit; a portable pressure medium tank unit; connections between such tank unit and the pressure medium instrumentality; and other connections between said tank and said compressor unit; pumping mechanism to supply said tank with water and a connection to convey water to said tank from a well, and power-transmitting mechanism between the power plant and the compressor unit.

3. A portable well renewing system comprising the following elements: a portable hammer conduit instrumentality adapted to be inserted in and removed from a well to deliver blows and pressure fluid to disintegrate and discharge from the well detritus and débris; a portable actuating mechanism for such instrumentality including a cable, a winch to operate the cable to cause the instrumentality to strike blows; a portable power unit including a chassis, tractor and guiding wheels, a motor, and means to operate the traction wheels; a portable compressor mounted on said chassis and operable by said motor; a tank chassis including a frame and ground wheels, a storage tank mounted thereon and thus made portable, a pipe line connection between said tank and compressor, and another pipe line connection between the tank and the pressure medium instrumentality.

4. A portable well renewing system comprising the following elements; a portable hammer conduit instrumentality adapted to be inserted in and removed from a well to deliver blows and pressure fluid to disintegrate and discharge from the well detritus and débris; a portable actuating mechanism for such instrumentality including a cable, a winch to operate the cable to cause the instrumentality to strike blows; a portable power unit including a chassis, tractor and guiding wheels, a motor, and means to operate the traction wheels; a portable compressor mounted on said chassis and operable by said motor; a tank chassis including a frame and ground wheels, a storage tank mounted thereon and thus made portable, a pipe line connection between said tank and compressor, and another pipe line connection between the tank and the pressure medium instrumentality, a power pump carried by the tank chassis and adapted to supply the tank with water from a water supply, and a pipe connection between the water in the tank and the well to deliver washing-out water thereto.

5. A portable well renewing system comprising the following elements: a portable hammer conduit adapted to be inserted into and removed from a well and adapted to deliver blows and pressure fluid to disintegrate and discharge from the well detritus and débris, a portable actuator therefor comprising a derrick, cable, winch and power drive for the cable; a portable power unit comprising a wheeled tractor chassis and motor; a portable compressor unit mounted on said power chassis; power transmitting devices from said motor to impart traction movement and to drive said compressor; a portable storage tank comprising a tank proper, a chassis therefor and transporting wheels; a power pump carried by said chassis and adapted to charge the tank with water from a supply; means to heat the water in the tank; pipe connections between the tank and the compressor; other pipe connections between the tank and the hammer conduit and a branch connection between the water in the tank and the last-named pipe connection.

6. A portable well renewing system comprising the following elements: a portable hammer conduit adapted to be inserted into and removed from a well, a hammer device at one end and a swivel connection at the other; a portable actuator therefor comprising a derrick, a cable connected to said swivel connection and a winch; a portable power unit comprising a wheeled chassis and a motor; a portable two-stage compressor mounted on said power chassis; power-transmitting devices operable by said motor to propel the chassis, operate the compressor and the actuator cable; a portable air and water storage tank comprising a tank proper and a wheeled chassis therefor; a power pump to supply said tank with water from the water supply; a pipe connection between the tank and compressor; another pipe connection between the tank and the hammer conduit, and a branch connection between said last-named pipe connection and the water in the tank, and means to heat such water, all for the purpose described.

7. In a portable well renewing system, the combination with a pressure tank, of a hammer conduit made of attachable sections and adapted to operate down in an oil-well, to act on the material to be removed and having at one end a connection to receive air and water under pressure from said tank, and at the other end a hammer head adapted to strike disintegrating blows against a body of detritus or débris.

8. In a portable well renewing system, the combination with a pressure tank, of a hammer conduit consisting of a series of pipe sections adapted at one end to receive water and air under pressure from said tank and a connection to raise and lower it, and having at the other end a tubular hammer head adapted to strike disintegrating blows by the fall of the conduit.

9. In combination, an apparatus for removing material from a well, an air line in the well and a hammer instrumentality, a source of air supply for acting on the material to be removed from the well and means for moving the air line hammer instrumentality up and down in the well to adjust its position.

10. A portable well renewing system comprising the following elements: portable hammer and pressure medium conduit instrumentalities insertable in and removable from a well and adapted to deliver blows and pressure fluid to disintegrate and discharge from the well detritus and débris; portable actuating mechanism for such instrumentalities; a portable power unit; a portable compressor unit; a portable pressure medium tank unit; connections between such tank unit and said compressor unit; other connections including a flexible portion between such tank and the pressure medium conduit; and power-transmitting mechanism between the power unit, and the compressor unit.

11. The herein described method of renewing oil wells by the removal of accumulated detritus or débris, consisting in the presence of a quantity of water in the well more or less submerging the detritus or débris; in the application of heavy blows by a hammering instrumentality against such detritus or débris; in imparting movement to said hammering instrumentality by an actuating instrumentality; in introducing against and amongst the detritus or débris a pressure medium by a conduit instrumentality; in discharging fragments of such detritus or débris upward, through and out of the well by such pressure medium; in accompanying such fragments with quantities of water also acted on by said pressure medium; in supplying said pressure medium to said conduit instrumentality from a pressure storage instrumentality; in supplying the pressure medium to such storage instrumentality by a compressor instrumentality; in causing the compressor instrumentality to compress the medium by a power instrumentality; and in applying to said several instrumentalities a drafting or moving agency to impart portability to them.

12. The herein described method of renewing oil wells by the removal of accumulated detritus or débris, consisting in the presence of a quantity of water in the well more or less submerging the detritus or débris; in the application of heavy blows by a hammering instrumentality against such detritus or débris; in imparting movement to said hammering instrumentality by an actuating instrumentality; in introducing against and amongst the detritus or débris a pressure medium by a conduit instrumentality; in discharging fragments of such detritus or débris upward, through and out of the well by such pressure medium; in accompanying such fragments with quantities of water also acted on by said pressure medium; in supplying said pressure medium to said conduit instrumentality from a pressure storage instrumentality through a flexible connection to follow the movements of the conduit instrumentality; in supplying the pressure medium to such storage instrumentality by a compressor instrumentality; in causing the compressor instrumentality to compress the medium by a power instrumentality; and in applying to said several instrumentalities a drafting or moving agency to impart portability to them.

13. The herein described method of renewing oil wells by the removal of accumulated detritus or débris consisting in the presence of a quantity of water in the well more or less submerging the detritus or débris; in the application of heavy blows by a hammering instrumentality against such detritus or débris; in introducing against and amongst the detritus or débris a pressure medium to carry the broken fragments with quantities of water upward, through, and out of the well.

14. The herein described method of renewing oil wells, consisting in the presence of a quantity of water in the well more or less submerging the detritus or débris; in the application of heavy blows by a hammering instrumentality against such detritus or débris; in simultaneously introducing against and amongst the detritus or débris a fluid under high pressure to aid in loosening up the mass and to carry the broken fragments with quantities of water upward, through, and out of the well.

15. The herein described method of renewing oil wells by the removal of accumulated detritus or débris consisting in the presence of a quantity of water in the well more or less submerging the detritus or débris; in the application of heavy blows by a hammering instrumentality against such detritus or débris; in introducing against and amongst the detritus or débris a pressure medium to carry the broken fragments with quantities of water upward, through, and out of the well; and in supplying further charges of water to the well if the quantity of detritus or débris requires.

16. The herein described method of renewing oil wells by the removal of accumulated detritus or débris consisting in the presence of a quantity of water in the well more or less submerging the detritus or débris; in the application of heavy blows by a hammering instrumentality against such detritus or débris; in introducing against and amongst the detritus or débris a pressure medium to carry the broken fragments with quantities of water upward, through, and out of the well; and in introducing into the well washing-out water under pressure to finally cleanse the interior thereof.

17. The herein described method of renewing oil wells by the removal of accumulated detritus or débris consisting in the presence of a quantity of water in the well more or less submerging the detritus or débris; in the application of heavy blows by a hammering instrumentality against such detritus or débris; in introducing against and amongst the detritus or débris a pressure medium to carry the broken fragments with quantities of water upward, through, and out of the well; in supplying further charges of water to the well if the quantity of detritus or débris requires; and in introducing into the well washing-out water under pressure to finally cleanse the interior thereof.

18. The herein described method of renewing oil wells, consisting in the presence of a quantity of water in the well more or less submerging the detritus or débris; in the application of heavy blows by a hammering instrumentality against such detritus or débris; in simultaneously introducing against and amongst the detritus or débris a fluid under high pressure to aid in loosening up the mass and to carry the broken fragments with quantities of water upward, through, and out of the well, and in introducing into the well under pressure washing-out water to cleanse the interior thereof.

19. The herein described method of renewing oil wells, consisting in the presence of a quantity of water in the well more or less submerging the detritus or débris; in the application of heavy blows by a hammering instrumentality against such detritus or débris; in simultaneously introducing against and amongst the detritus or débris a fluid under high pressure to aid in loosening up the mass and to carry the broken fragments with quantities of water upward, through, and out of the well; in supplying further charges of water if the quantity of detritus or débris requires; and in introducing into the well, under pressure, washing-out water to cleanse the interior thereof.

20. The herein described method of renewing oil wells, consisting in the presence of a quantity of water more or less submerging the detritus or débris down in the well; in the application of heavy blows by a hammering instrumentality against such detritus or débris; in the simultaneous introduction through said instrumentality and against and amongst the detritus or débris of a blast of air under high pressure to aid in loosening up the obstructions and to carry off the broken fragments with quantities of water upward, and out of the well between such instrumentality and the well casing; in supplying further charges of water if the quantity of detritus or débris requires and in introducing into the well, under pressure, washing-out water to finally cleanse the interior of the well.

21. The herein described method of renewing oil wells, consisting in discovering in a well or supplying thereto a quantity of water sufficient to more or less submerge detritus or débris therein; in the application of heavy blows by a sharp hammering instrumentality given an alternate lifting and dropping motion from and against the detritus or débris effected by a portable power plant brought up to the well; in the simultaneous introduction through such instrumentality and against and amongst the detritus or débris of atmospheric air supplied by a portable compressor brought up to the well for that purpose, whereby the disintegration is aided and the fragments with quantities of water are carried upward through the well between its casing and such instrumentality; in periodically supplying further charges of water if the quantity of detritus or débris requires; in introducing into the well, under pressure, washing-out water through said instrumentality to finally cleanse the interior of the well, such supplies of water being taken from a portable pressure tank brought up to the well for such purpose; such pressure being created by said portable compressor; and such compressor being actuated by said portable power plant.

22. In a method of cleaning a well, introducing a supply of air and water under pressure into the well to a predetermined point, releasing the air at said predetermined point and blowing the loose material in the well at that point out of the well.

In testimony whereof, I affix my signature.

IRWIN L. DUNN.